United States Patent [19]
Saitoh et al.

[11] Patent Number: 4,777,526
[45] Date of Patent: Oct. 11, 1988

[54] SECURITY MONITOR SYSTEM

[75] Inventors: Mitsumasa Saitoh, Kanagawa; Shigeru Ohmuro, Tokyo; Susumu Tagawa, Kanagawa; Kenichiro Kumamoto, Tokyo, all of Japan

[73] Assignee: Sony Corporation, Tokyo, Japan

[21] Appl. No.: 58,403

[22] Filed: Jun. 5, 1987

[30] Foreign Application Priority Data

Jun. 23, 1986 [JP] Japan .................. 61-146660

[51] Int. Cl.⁴ .............................................. H04N 7/18
[52] U.S. Cl. ...................... 358/108; 358/86; 358/191.1
[58] Field of Search ............ 358/108, 86, 191.1, 358/193.1, 194.1

[56] References Cited

U.S. PATENT DOCUMENTS

| | | | |
|---|---|---|---|
| 3,105,873 | 10/1963 | Winston | 358/86 |
| 3,423,521 | 1/1969 | Friesen | 358/86 |
| 4,081,830 | 3/1978 | Mick | 358/108 |
| 4,120,004 | 10/1978 | Coutta | 358/108 |
| 4,249,206 | 2/1981 | Roscoe | 358/108 |
| 4,511,929 | 4/1985 | Maeda | 358/296 |
| 4,581,634 | 4/1986 | Williams | 358/108 |
| 4,630,110 | 12/1986 | Cotton | 358/108 |
| 4,649,428 | 3/1987 | Jones | 358/188 |
| 4,651,143 | 3/1987 | Yamanaka | 358/108 |
| 4,673,974 | 6/1987 | Ito | 358/86 |

*Primary Examiner*—Howard W. Britton
*Attorney, Agent, or Firm*—Ronald P. Kananen

[57] ABSTRACT

A security monitor system is designed to transmit video signals from a plurality of video information sources via a common transmission line. Video information from respective video information sources is scanned at given timings to check the monitoring areas in a given order. An automatic recognition may be facilitated in the security monitor system for detecting substantial and noticable movement within a picture derived from the video information from each of the video signal sources. Therefore, the security monitor system is inexpensive and satisfactory for monitoring a plurality of monitoring areas and is satisfactory for recording video information of a variety of monitoring areas, when movement in the picture of one of the monitoring areas is detected, by means of a video tape recorder or other appropriate recording means.

29 Claims, 1 Drawing Sheet

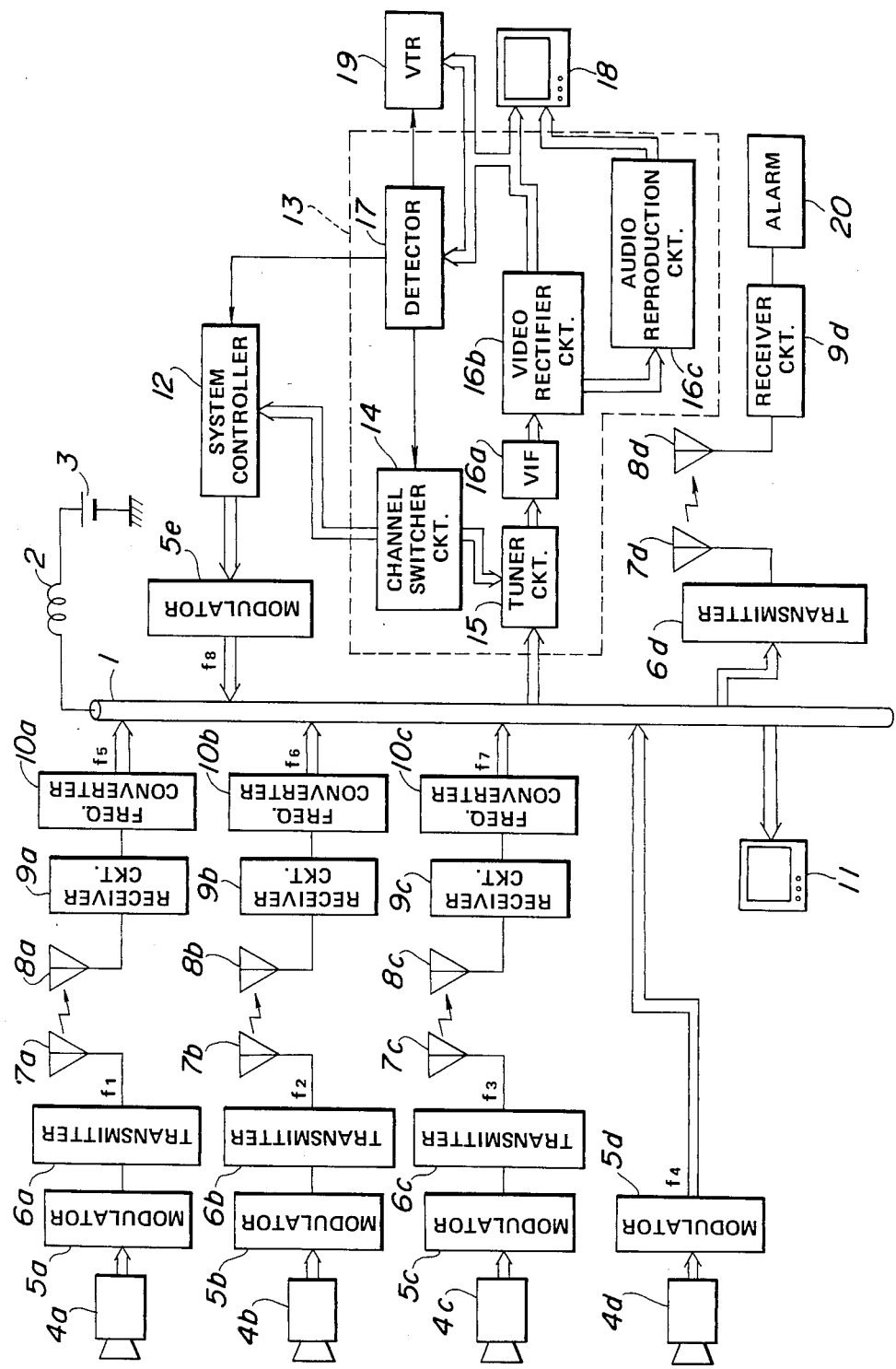

4,777,526

SECURITY MONITOR SYSTEM

BACKGROUND OF THE INVENTION

1. Field of the Invention

The present invention relates generally to a security monitor system which employs one more video cameras for monitoring an area which will be hereafter referred to as, a "monitoring area". More specifically, the invention relates to a security monitor system employing a plurality of video cameras for monitoring a plurality of monitoring areas.

2. Description of the Background Art

In recent years, there have been proposed various security monitor systems. Some of these conventional security monitor systems employ video cameras for monitoring the monitoring areas. Video signals are usually reproduced on video monitors for allowing visual monitoring at a place remote from the monitoring areas. Alternatively, the video signals may be recorded with video tape recorders (VTR's).

Conventionally, the video cameras are connected to respectively corresponding video monitors through independent signal lines for monitoring a plurality of monitoring areas. This requires a number of video monitors that corresponds to the number of video signals thus incurring substantial cost. In some of the more recently developed systems, attempts have been made to reduce the cost of such security monitor systems by providing a common video monitor which can receive video signals from a plurality of video cameras. In such case, the video signals from different video cameras are switched in a time-sharing manner or by a manual switching operation. However, even with such systems, the video cameras have to be connected to the common video monitor via mutually independent signal lines. Therefore, the number and length of the signal lines keep the costs high. In addition, proper adjustment of the switching timing is difficult to determine, since the switching intervals should not be too long to allow monitoring of all of the respective areas within a resonable period, but the period in which the picture of one monitoring area is displayed should be long enough to visually monitor movement occurring in the picture at the corresponding monitoring area.

Furthermore, when the video signals from a plurality of video cameras are to be recorded by means of a common VTR, the obtained information is not complete for any of monitoring area.

SUMMARY OF THE INVENTION

Therefore, it is an object of the present invention to provide a novel and useful security monitor system which can avoid the problems encountered in the prior art.

Another object of the invention is to provide a security monitor system which is inexpensive and satisfactory for monitoring a plurality of monitoring areas.

A further object of the invention is to provide a security monitor system which can provide satisfactory recording video information for a variety of monitoring areas in cases where the video information is to be recorded on a common VTR tape.

In order to accomplish the aforementioned and other objects, a security monitor system, according to the present invention, includes a plurality of image pick-up devices for picking-up image data of a monitoring area and producing video signals. The video signals from the plurality of video information sources are transmitted via a common transmission line by way of frequency dividing. Video information from respective video information sources is scanned at given timings to check the monitored areas in a given order.

Preferably, automatic recognition of movement in the picture derived from the video information is provided to each of the video signal sources. Automatic recognition of movement in the picture is carried out by comparing video information received at different timings from the same video information source in a pixel-to-pixel manner.

According to one aspect of the invention, a security monitor system comprises a plurality of image pick-up devices, each provided at a preselected position for monitoring a preselected monitoring area, and each of the image pick-up devices produces a mutually distinct channel of video information representative of the picked-up image, a single video monitor adapted to reproduce respective channels of video information, a common signal transmission line for receiving the video information from the respective image pick-up devices, the signal transmission line being connected to the video monitor for feeding a channel of video information thereto, and a channel selection means, interposed between the common signal transmission line and the video monitor for selecting and periodically changing between given timings the channel to be reproduced by the video monitor.

In order to obtain a record of the conditions at the monitoring area, about which a noticable change in the video information can be detected, the security monitor system may further comprise a recording means for recording the video information. When the recording means is employed in the security monitor system, it would be preferable that the recording means comprises a video tape recorder. Or alternatively, the recording means is a video printer.

On the other hand, in the preferred construction, the image pick-up device may comprise a video camera with a microphone for picking up not only the video information but also audio information.

In order to automatically detect movement in the picture of the monitoring area, it would be preferable to provide a detector means in the security monitor system, which can detect movement in the picture on a selected channel of video information and produce an alarm. For security monitoring purposes, the channel selecting means is so associated with the detector means as to be responsive to the detector detecting movement in a picture on one of the channels to fix the channel to be selected as the channel where the movement is detected, for a predetermined period which is longer than a given interval between the switching timing.

So as to shorten extension of the signal transmission line required, the security monitor system further comprises a plurality of radio transmitters, each connected to a respective one of the image pick-up devices for transmitting a radio signal containing the video information, and a radio receiver connected to the common signal transmission line and adapted to receive the radio signals to feed video information contained in the radio signals to the signal transmission lines.

According to another aspect of the invention, a security monitor system comprises a plurality of image pick-up devices, each provided for monitoring a preselected monitoring area, and each of the image pick-up devices produces a specific frequency of video information whose frequency information is distinct from that produced by other image pick-up devices to comprise one monitoring channel representative of the picked-up image, a single video monitor adapted to reproduce respective channels of video information, a common signal transmission line for receiving the video information from the respective image pick-up devices, the signal transmission line being connected to the video monitor for feeding video information thereto, a tuner circuit interposed between the common signal transmission line and the video monitor for receiving video information of the selected channel to be monitored, a detector circuit receiving video information from the tuner circuit for detecting change in video information of a given channel to output a detector signal, and a channel selection means normally operative to switch monitoring channels at a given constant interval, and being responsive to the detector signal for fixing the channel to be received by the tuner circuit for a given period of time which is substantially longer than the given switching interval, interposed between the common signal transmission line and the video monitor and associated with the tuner circuit, for selecting the channel to be received by the tuner circuit and switching channel to be reproduced on the video monitor via the tuner circuit.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

DETAILED DESCRIPTION OF THE PREFERRED EMBODIMENTS

Referring now to the drawing, the preferred embodiment of a security monitor system, according to the invention, employs an image pick-up device, such as a video camera, for picking-up a visual image of a monitoring area toward which the image pick-up device is directed. The shown embodiment of the security monitor system is directed to monitor four monitoring areas by means of four video cameras 4a, 4b, 4c and 4d. Though a specific number of video cameras are employed in the shown embodiment, the number of video cameras to be employed in the security monitor system according to the invention can be selected according to the number of monitoring areas to be monitored.

The video information obtained via the video cameras 4a, 4b, 4c and 4d- is transmitted through a common video signal transmission line 1. In the shown embodiment, a coaxial cable is used as the video signal transmission line 1. The coaxial cable 1 is connected to a DC power source 3 via a choke coil 2.

Each of the video cameras 4a, 4b, 4c and 4d is directed to its respectively selected monitoring area for obtaining video information about the corresponding monitoring area. The video cameras 4a, 4b, 4c and 4d are connected to modulators 5a, 5b, 5c and 5d to feed information signals consisting of video signals and audio signals thereto for forming respective monitoring channels.

It should be appreciated that each of the monitoring channels have a mutually distinct frequency in order to avoid mutual interference of the signals. The individual channels on which the video images picked up by the respective video cameras 4a, 4b and 4c are conveyed, will be hereafter referred to as first monitoring channel", "second monitoring channel", and "third monitoring channel".

The modulators 5a, 5b, 5c and 5d superimpose the audio signals onto the corresponding video signals in a form equivalent to broadcasted TV signals. The modulators 5a, 5b and 5c further perform RF-modulation to form first, second and third monitoring channels at radio frequencies $f_1$, $f_2$ and $f_3$. On the other hand, the modulator 5d connected to the video camera 4d performs RF-modulation to form a signal having a frequency $f_4$ which is different from frequencies of television channels. This modulated information signal with the frequency $f_4$ serves as a "fourth monitoring channel" information signal, and the frequency $f_4$ of the fourth monitoring channel information signal is further distinct from the first, second and third monitoring channels of information signals. The modulator 5d is directly connected to the coaxial cable 1 to feed the modulated fourth monitoring channel signal thereto. On the other hand, the modulators 5a, 5b and 5c are connected to audio transmitters 6a, 6b and 6c. The transmitters 6a, 6b and 6c modulate the first, second and third monitoring channel signals from the modulators 5a, 5b and 5c with predetermined frequency carrier waves for forming radio signals on the respective first, second and third monitoring channels. The frequencies of the carrier waves may be different from each other so as to avoid mutual interference between the transmitted information of each channel. The transmitters 6a, 6b and 6c transmit radio signals through transmitter antennas 7a, 7b and 7c. The transmitted signals are received by receiver antennas 8a, 8b and 8c which are respectively associated with receiver circuits 9a, 9band 9c. The receiver circuits 9a, 9b and 9c incorporate demodulators (not shown) for demodulating the received radio signals by removing the carrier waves to obtain first, second and third monitoring channel signals of the frequencies $f_1$, $f_2$ and $f_3$. The demodulated signals are fed from the receivers 9a, 9b and 9c to frequency converters 10a, 10b and 10c. The frequency converters 10a, 10b and 10c convert the signals of the respective first, second and third monitoring channels obtained from the receivers 9a, 9b and 9c into frequencies $f_5$, $f_6$ and $f_7$. The frequencies $f_5$, $f_6$ and $f_7$ are selected to be mutually different from each other and from the television channel frequencies. The frequencies $f_5$, $f_6$ and $f_7$ of the first, second and third monitoring channel signals are also differentiated from the frequency $f_4$ of the fourth monitoring channel information signal from the modulator 5d. On the other hand, the frequencies $f_5$, $f_6$ and $f_7$ are set in a frequency band near the frequency $f_4$. The converters 10a, 10b and 10c are connected to the coaxial cable 1 to feed the frequency converted signals thereto.

The coaxial cable 1 receiving the signals at the frequencies $f_4$, $f_5$, $f_6$ and $f_7$, can be connected to an antenna input terminal of a television receiver 11 which is capable of reproducing the broadcasted television signals. In order to allow monitoring operation by means of the television receiver 11, the television receiver can be set at the frequencies $f_4$, $f_5$, $f_6$ and $f_7$ of the fourth, first, second and third monitoring channel signals by means of the television tuner. For setting the channel frequencies $f_4$, $f_5$, $f_6$ and $f_7$ for the security monitor, the channels which are not used for receiving broadcasted television signals, may be used. Therefore, the picture showing respective monitoring areas can be reproduced on a television monitor screen by setting the channels set at the frequencies $f_4$, $f_5$, $f_6$ and $f_7$. This facilitates monitoring of the monitoring areas on a normal television receiver 11.

On the other hand, a microprocessor-based system controller 12 can be connected to the coaxial cable 1 via a modulator 5e. The system controller 12 produces control signals for controlling operation of the system components. For example, the system controller 12 outputs an alarm signal when noticable movement or change in picture showing one of the monitoring areas, is detected. The control signal produced by the system controller 12 is transmitted to the coaxial cable 1 via the modulator 5e and then transmitted to various system components via the coaxial cable.

A scanning control circuit 13 is also connected to the coaxial cable 1 to receive therefrom respective monitoring channel signals. The scanning control circuit 13 comprises a channel switcher circuit 14, a tuner circuit 15, an intermediate frequency amplifier circuit 16a, a video rectifier circuit 16b, an audio reproduction circuit 16c, and a detector circuit 17. The video rectifier circuit 16b and the audio reproduction circuit 16c are connected to a video monitor 18 and a VTR 19. On the other hand, the channel switcher circuit 14 is connected to the tuner circuit 15 for outputting a channel switching command which contains data identifying the selected one of the first, second, third and fourth monitoring channels, for selecting the monitoring area to be displayed on the video monitor 18. The channel switcher circuit 14 is operable to switch the channels at constant predetermined intervals in normal conditions in which a noticable or substantial change in pictures reproduced is not detected. The tuner circuit 15 is responsive to the channel switching command to change the receiving frequencies between $f_5$, $f_6$, $f_7$ and $f_4$ of the first, second, third and fourth channels. By switching the channel to receive one of the first, second, third and fourth monitoring channel signals having frequencies $f_4$, $f_{5,6}$ and $f_7$, the monitoring area to be observed through the video monitor 18 can be switched. The signal received by the tuner circuit 15 is fed to the video rectifier circuit 16b via the intermediate frequency amplifier circuit 16a. The video rectifier circuit 16b rectifies the information signal and separates the audio signal component from the signal to feed it to the audio reproduction circuit 16c. The rectified video signal is output from the video rectifier circuit 16b to the video monitor for video reproduction. On the other hand, the audio signal is also fed to the video monitor 18 via the audio reproduction circuit 16c.

The detector circuit 17 is connected to the video rectifier circuit 16b to receive the video signal therefrom. The detector circuit 17 incorporates a memory for temporarily storing each field of the video information. The memory in the detector circuit 17 also stores the data indicative of the monitoring channel corresponding to the stored video information. At each time the video information from the video rectifier 16b is received, the detector circuit 17 detects the channel of the received video information and reads out the corresponding channel of stored video information. In practice, the memory in the detector circuit 17 stores the video information from the previous field. Therefore, the read out video information is the video information of the previous field of the same monitoring channel. The detector compares the video information received from the video rectifier circuit 16b with the read out video information stored therein.

In practice, the video information to be compared for detecting movement of the picture is luminance data. The detector circuit 17 thus compares luminance data of each pixel with the luminance data of the corresponding pixel in the former field. In practice, the detector circuit 17 generates an error signal when a difference of the luminance data in the corresponding pixel is greater than a given threshold value.

It is of course preferable to check all of the pixels in each field of video data for a difference. However, it will prolong the time required for the comparing operation in the detector to do so. This apparently requires a longer interval between switching of the monitoring channels by means of the channel switcher circuit 14. On the other hand, for the security monitoring purpose, it would be sufficient to check a reduced number of pixels in the fields. Therefore, it is practical to perform one comparison operation for a given number of pixels or to check only part of the image field.

In addition, the video information picked-up by the video information can contain noise components. Such noise components may affect security monitoring operation and tend to cause false alarms due to a difference of video data in the corresponding pixels. In order to avoid such erroneous detection due to noise components contained in the video information, the detector circuit 17 incorporates an error counter to count up the occurrence of errors in the signal. The detector circuit 17 judges that the picture in the video signal moves from that in the former frame, when the counter value of the error counter becomes greater than a given error threshold. When substantial movement of the picture between the adjacent fields is detected, the detector circuit 17 produces a detector signal indicative thereof. The detector signal of the detector circuit is fed to the system controller 12 and the channel switcher circuit 14.

The channel switcher circuit 14 is responsive to the detector signal to fix the channel for a predetermined period of time which is much longer than the normal switching interval. The predetermined period of time is set at a period long enough to continuously check the channel where the picture movement is detected for a reasonable number of fields in view of security. Therefore, during this period, the channel switcher circuit 14 outputs the channel switching command indicative of the fixed channel. At the same time, the VTR is actuated in response to the error signal to start recording information contained in the signal of the fixed channel for recording the abnormality occurring in the corresponding monitoring area.

Though the shown embodiment employs a VTR as its recording medium for recording abnormality in the monitoring area about which noticable and substantial change of the picture is detected, it can be replaced with any other appropriate medium, such as an electronic still camera, a video printer and so forth. In such case, a still image may be picked-up from the video information of the video signal output from the video rectifier circuit in response to the alarm signal.

The system controller 12 receives the channel switching command from the channel switcher circuit 14 in response to the detector signal from the detector circuit 17. Based on the channel switching signal, the system controller 12 determines the monitoring area where movement has been detected. The system controller 12 then outputs the alarm signal which contains information concerning the monitoring area about which the movement of the picture is detected. The alarm signal is modulated by the modulator 5e into a form suitable for radio transmission and fed to the coaxial cable 1 at a predetermined specific frequency $f_8$. Through the coaxial cable 1, the modulated alarm signal is fed to a transmitter 6d. The transmitter 6d filters out the frequencies other than the alarm signal frequency $f_8$ and transmits the modulated alarm signal through a transmitter antenna 7d. The transmitted alarm signal is received by means of a receiver antenna 8d which is connected to a receiver circuit 9d. The receiver circuit 9d demodulates the received alarm signal to output a drive signal for an alarm device 20. The alarm device 20 may comprise an alarm lamp, buzzer, bell or so forth. If necessary, a plurality of alarm indicator lamps may be provided in the alarm device 20, each of which indicates an abnormal condition at a respectively corresponding monitoring area.

Alternatively, it may be possible to transmit information including the information of the monitoring area in which the abnormal condition is detected, through a telephone line to a remote place.

Therefore, since the aforementioned security monitor system according to the present invention employs a common coaxial cable for transmitting information from a plurality of video cameras, signal lines connecting each video camera to the video monitor becomes unnecessary. Furthermore, since the channel containing signals from each of the video cameras is displayed at constant given intervals, a plurality of monitoring areas can be monitored until substantial movement in the picture of one of the monitoring areas is detected. On the other hand, since the preferred embodiment of the security monitor system employs the automatic detection of movement in the picture, the channel of the video camera which monitors the monitoring area where some change occurs can be automatically, selected and observation of that monitoring area can be continued by fixing the channel for the given period of time.

Furthermore, since the security monitor system of the present invention employs radio transmission for transmitting the information from the video cameras to the coaxial cable, the signal lines are significantly shortened. By employing radio communication for data transmission, selection of the monitoring area becomes easier. In addition, by employing a common coaxial cable as the data transmission line, the distance between the transmitter antennas and the receiver antennas can be minimized to minimize the power required for radio transmission.

Though the shown embodiment employs radio transmission for feeding the video information to the common coaxial cable from the video cameras, it would be possible to connect the signal line of each video signal to the coaxial cable in substantially the same manner to as the video camera 4d. Even in such case, substantial reduction of the overall length of the signal lines in the security monitor system can be obtained.

While the present invention has been disclosed in terms of the preferred embodiment of the invention in order to facilitate a better understanding of the invention, it should be appreciated that the present invention can be embodied in various ways including any possible modifications of the shown embodiment. Therefore, the invention should be understood to include all of the possible embodiments and modifications of the shown embodiments which can be embodied without departing from the principles of the invention as set out in the appended claims.

What is claimed is:

1. A security monitor system for monitoring a plurality of preselected monitor areas and for detecting a change of condition in a respective monitoring area, comprising:
    a plurality of image pick-up devices, each directed to one of said preselected monitoring areas for picking up a video image of respectively corresponding monitor areas, and each of said image pick-up devices produces a signal at a mutually distinct frequency, which corresponds to a mutually distinct television channel which contains video information representative of the picked-up image;
    a signal video monitor adapted to reproduce the channels of video information signals at their respective intervals;
    a common signal transmission line receiving said video information signals from respective image pick-up devices, said signal transmission line being connected to said video monitor for feeding one of video information signals thereto; and
    a channel selection means, interposed between said common signal transmission line and said video monitor for selecting one of said channels to be reproduced by said video monitor and switching to another channel at a given timing.

2. A security monitor system as set forth in claim 1, wherein said image pick-up device comprises a video camera with a microphone for picking up not only the video information but also audio information.

3. A security monitor system as set forth in claim 1, which further comprises a plurality of radio transmitters each connected to one of said image pick-up device for transmitting a radio signal containing said video information and a radio receiver connected to said common signal transmission line and adapted to receive said radio signal to feed video information contained in said radio signal to said signal transmission line.

4. A security monitor system as set forth in claim 1, which further comprises a detector means for receiving selected channel of said video information and detecting movement in the image of said selected channel to produce an alarm.

5. A security monitor system as set forth in claim 4, wherein said channel selecting means is responsive to said detector detecting movement of picture in one of said channels to fix the channel to be selected as the channel where the picture movement is detected, for a predetermined period which is longer than the interval between said given switching timings.

6. A security monitor system as set forth in claim 5, wherein said image pick-up device comprises a video camera with a microphone for picking up not only the video information but also audio information.

7. A security monitor system as set forth in claim 1, which further comprises a recording means for recording said video information.

8. A security monitor system as set forth in claim 2, wherein said recording means comprises a video tape recorder.

9. A security monitor system as set forth in claim 8, which further comprises a detector means receiving a selected channel of said video information signal to detect movement in the image on said selected cannel to produce an alarm.

10. A security monitor system as set forth in claim 9, wherein said channel selecting means is responsive to said detector detecting movement in the image on one of said channels to fix the channel to be selected as the channel where the picture movement is detected, for a predetermined period which is longer than a given interval between said switching timing, and said video tape recorder is responsive to start recording of video information of the selected channel.

11. A security monitor system as set forth in claim 2, wherein said recording means is a video printer.

12. A security monitor system as set forth in claim 11, which further comprises a detector means receiving selected channel of said video information to detect movement in said image on said selected channel to produce an alarm, said channel selecting means is responsive to said detector detecting movement in the image in one of said channels to fix the channel to be selected as the channel where the picture movement is detected, for a predetermined period which is longer than a given interval between said switching timing, and said video printer is responsive to make a video print showing the video information of the selected channel.

13. A security monitor system comprising:
a plurality of image pick-up devices, each provided for monitoring a preselected monitoring area, and each of said image pick-up devices produces a specific frequency of video information corresponding to one monitoring channel, representative of the picked-up image, which frequency of the video information signal is distinct from that produced by other image pick-up devices;
a single video monitor adapted to reproduce video information on respective channels;
a common signal transmission line for receiving said video information from respective image pick-up devices, said signal transmission line being connected to said video monitor for feeding video information thereto;
a tuner circuit interposed between said common signal transmission line and said video monitor for receiving video information of a selected monitoring channel;
a detector circuit for receiving video information from said tuner circuit to detecting change in video information of a given channel to output a detector signal; and
a channel selection means, interposed between said common signal transmission line and said video monitor and associated with said tuner circuit, for selecting one of said channels to be received by said tuner circuit and switching the channel to be reproduced by said video monitor via said tuner circuit, said channel selecting means normally operative to switch monitoring channels at constant given intervals, and said channel selecting means being responsive to said detector signal for fixing the channel to be received by said tuner circuit for a given period of time which is substantially longer than said given switching interval.

14. A security monitor system as set forth in claim 13, wherein said image pick-up device comprises a video camera with a microphone for picking up not only the video information but also audio information.

15. A security monitor system as set forth in claim 13, which further comprises a plurality of radio transmitters each connected to one of said image pick-up devices for transmitting radio signal containing said video information and a radio receiver connected to said common signal transmission line and adapted to receive said radio signal to feed video information contained in said radio signal to said signal transmission line.

16. A security monitor system as set forth in claim 13, which further comprises a recording means for recording said video information.

17. A security monitor system as set forth in claim 16, wherein said recording means is a video printer.

18. A security monitor system as set forth in claim 14, wherein said recording means comprises a video tape recorder.

19. A security monitor system as set forth in claim 17, which further comprises an alarm device which is responsive to said detector signal to produce an alarm.

20. A security monitor system comprising:
a plurality of image pick-up devices, each provided at a preselected position for monitoring a preselected monitoring area, and each of said image pick-up devices produces a signal at a mutually distinct frequency which corresponds to a mutually distinct television channel, which contains video information representative of the picked-up image;
a single video monitor adapted to reproduce the channels of video information signals at their respective intervals;
a common signal transmission line receiving said video information signals from respective image pick-up devices, said signal transmission line being connected to said video monitor for feeding one of the video information signals thereto; and
a channel selection means, responsive to said detector detecting movement of picture in one of said channels, for selecting said one of the channels about which movement of picture is detected to fix the channel for a predetermined period.

21. A security monitor system for monitoring a plurality of preselected monitor areas and for detecting a change of condition in a respective monitor area, comprising:
a plurality of image pick-up devices, each directed to one of said preselected monitoring areas for picking up a video image of respectively corresponding monitor areas, and each of said image pick-up devices being designed to continuously produce a picked up image indicative signal at a mutually distinct frequency, which corresponds to a mutually distinct television channel;
a signal video monitor adapted to reproduce the channels of video information signals at their respective intervals;
a common signal transmission line receiving said video information signals from respective image pick-up devices, said signal transmission line being connected to said video monitor for feeding one of the video information signals thereto; and
a channel selection means, interposed between said common signal transmission line and said video monitor for periodically selecting one of said channels to be reproduced by said video monitor and switching to another channel at a given timing.

22. A security monitor system comprising:
a plurality of image pick-up devices, each provided at a preselected position for monitoring a preselected monitoring area, and each of said image pick-up devices produces a signal at a mutually distinct frequency, which corresponds to a mutually distinct television channel which contains video information representative of the picked-up image;

a single video monitor adapted to reproduce the channels of video information signals at their respective intervals;

a common signal transmission line receiving said video information signals from respective image pick-up devices, said signal transmission line being connected to said video monitor for feeding one of the video information signals thereto;

a detector means for receiving a selected channel of said video information and detecting movement in the image of said selected channel to produce an alarm; and a channel selection means, interposed between said common signal transmission line and said video monitor for selecting one of said channels to be reproduced by said video monitor and switching to another channel at a given timing, wherein said channel selecting means is responsive to said detector means detecting movement of a picture in one of said channels to fix the channel to be selected as the channel where the picture movement is detected, for a predetermined period which is longer than the interval between said given switching timings.

23. A security monitor system as set forth in claim 22, wherein said image pick-up device comprises a video camera with a microphone for picking up not only the video information but also audio information.

24. A security monitor system as set forth in claim 22, wherein said image pick-up device comprises a video camera with a microphone for picking up not only the video information but also audio information.

25. A security monitor system as set forth in claim 22, which further comprises a plurality of radio transmitters each connected to one of said image pick-up device for transmitting a radio signal containing said video information and a radio receiver conected to said common signal transmission line and adapted to receive said radio signal to feed video information contained in said radio signal to said signal transmission line.

26. A security monitor system as set forth in claim 22, which further comprises a recording means for recording said video information.

27. A security monitor system as set forth in claim 23, wherein said recording means comprises a video tape recorder.

28. A security monitor system as set forth in claim 23, wherein said recording means is a video printer.

29. A security monitor system as set forth in claim 28, wherein said video printer is responsive to make a video print showing the video information of the selected channel.

* * * * *